United States Patent [19]

Mitchell et al.

[11] Patent Number: 4,751,981
[45] Date of Patent: Jun. 21, 1988

[54] DETACHABLY MOUNTED LADDER RACK

[76] Inventors: John C. Mitchell, 1567 SW. Greensiding; Steven R. Mitchell, 1999 SW. Linnel St., both of Roseburg, Oreg. 97470

[21] Appl. No.: 103,718

[22] Filed: Oct. 2, 1987

[51] Int. Cl.⁴ .............................................. B60R 11/00
[52] U.S. Cl. ..................................... 182/127; 182/129; 182/93; 224/42.43
[58] Field of Search ................... 182/127, 93, 129; 224/42.43, 42.42, 42.38

[56] References Cited

U.S. PATENT DOCUMENTS

| | | | |
|---|---|---|---|
| 1,959,611 | 5/1934 | Brengel | 224/42.38 |
| 2,080,527 | 5/1937 | Bixel | 182/127 |
| 2,237,853 | 4/1941 | Troche | 224/42.43 |
| 3,283,972 | 11/1966 | Kocina | 182/127 |
| 4,008,838 | 2/1977 | Correll | 182/127 |
| 4,390,117 | 6/1983 | Fagan | 182/127 |

Primary Examiner—Reinaldo P. Machado
Attorney, Agent, or Firm—James D. Givnan, Jr.

[57] ABSTRACT

A ladder rack for pickup trucks mounted in a detachable manner along one side of truck box. A pair of stanchions each having upper ends provided with arms for ladder support. Brackets attach to the truck box side wall in parallel therewith. Posts on each bracket as well as sockets defined by the brackets receive a weldment at each stanchion lower end the weldments having keyhole openings for post reception and pins for insertion into the bracket sockets. A flexible lock automatically engages a post on the stanchion to prevent accidental upward displacement of the stanchion during truck travel.

7 Claims, 1 Drawing Sheet

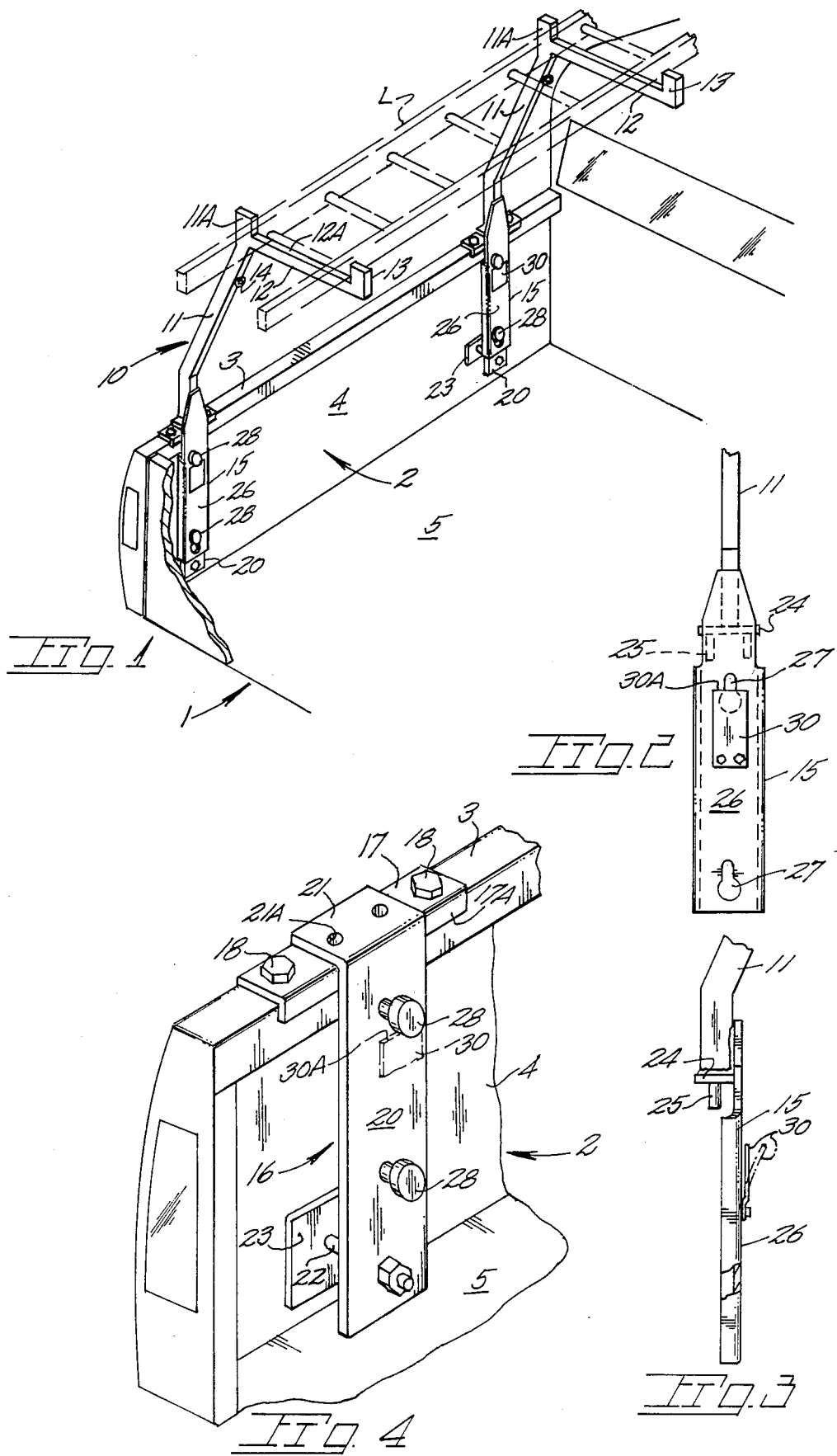

DETACHABLY MOUNTED LADDER RACK

BACKGROUND OF THE PRESENT INVENTION

The present invention pertains generally to ladder racks for trucks for transporting ladders above a pickup truck box.

In wide use today are ladder racks disposed above truck boxes. Such ladder racks have at least four supports permanently attached to the corners of the truck box. Vehicle usefulness is hindered to the extent that present ladder racks are heavy to reduce operating efficiency of the truck and secondly do not permit large bulky items to be carried in the truck box. Accordingly, it is desirable to have a ladder rack which is readily removable from the truck box.

SUMMARY OF THE INVENTION

The present invention is embodied in a ladder rack having removable front and rear stanchions with arms on which ladders may be transported.

The stanchions are equipped at their lower ends with weldments which are engageable with truck box mounted brackets. The stanchions are of a size and weight to enable installation and removal by one person without involved effort. The weldments, in conjunction with the brackets, support the stanchions against vertical as well as lateral loads. Further, a locking device prevents stanchion movement in response to negative gravity loads. Such a device may include a clip which, in its normal position, abuts a bracket mounted post. Release of the safety device is manually accomplished. Provision is made for use of the present rack on both single and double wall truck boxes i.e., with truck boxes having planar or irregular inner wall surfaces.

Important provisions include the provision of a ladder rack which is readily installed and removed from a truck box by one person; the provision of a ladder rack wherein a truck mounted bracket does not hinder use of the truck box for other transporting tasks; the provision of a ladder rack having a device preventing upward displacement of the rack during truck travel.

BRIEF DESCRIPTION OF THE DRAWINGS

In the accompanying drawing:

FIG. 1 is a perspective view of a pickup truck box with the present ladder rack in place;

FIG. 2 is a vertical elevational view taken along line 2—2 of FIG. 1; and

FIG. 3 is an elevational view taken along line 3—3 of FIG. 2.

DETAILED DESCRIPTION OF THE PREFERRED EMBODIMENT

With continuing attention to the drawing wherein applied reference numerals indicate parts similarly hereinafter identified, the reference numeral 1 indicates generally a pickup truck box for the transporting of various loads.

Typically load carrying truck boxes include a side wall structure generally at 2 including an uppermost surface 3 and an upright inner side wall 4. A truck box bed is indicated at 5.

Indicated generally at 10 is the present ladder rack which includes a pair of stanchions 11. As the stanchions are identical, the following description will be limited to but one of same.

The stanchion includes an elevated arm member 12 having a distal end segment 13 turned upwardly for the confinement of a load such as one or more ladders on an arm surface 12A. An upright stanchion extension 11A additionally confines the arm carried load. An eye 14 on the stanchion serves to receive the hook equipped ends of a bungee cord which is stretched about the ladder or ladders (or other load) to confine same on arm surface 12A.

Stanchion 11 is preferably canted inwardly to locate the arm member 12 entirely above the truck box and in a plane above the truck cab roof. Stanchion 11 terminates downwardly in a weldment 15 which will be later described in detail.

A bracket is indicated generally at 16 for securement to the truck box side wall to support the stanchion in a detachable manner. Said bracket includes a horizontal component 17 secured to the uppermost surface 3 of the box side wall by fasteners 18. A lip 17A projects downwardly from said horizontal component. Carried by the horizontal component is a vertical bracket component 20 having an angular upper end 21 welded or otherwise secured to horizontal component 17 of the bracket. Angular upper end 21 defines sockets 21A to receive the later described pin elements carried by weldment 15. A brace at 22 is threaded and thereby adjustably carried by vertical component 20 of the bracket and terminates in abutment with a side wall mounted plate 23. Accordingly, vertical component 20 is braced in an adjustable manner against lateral displacement when the truck box side wall is offset from a vertical plane containing the opposing surface of vertical component 20 as would be the case in a single wall, truck box construction. In truck boxes of double wall construction, vertical component 20 of the bracket would be disposed in abutment or in proximity of the side wall innermost surface in which case brace is dispensed with.

Weldment 15 and the stanchion carried thereby are adapted for convenient attachment to the bracket to enable stanchion installation and removal in rapid fashion. Said weldment includes a first member 24 for superimposed placement on the bracket and is equipped with pins as at 25 for insertion into sockets 21A. A second member 26 of the weldment is perpendicular to said first member and defines multiple, inverted keyhole openings 27 which receive head equipped posts 28 carried by bracket 16. Accordingly, passage of the head equipped posts through the openings with subsequent downward movement of the weldment locks the weldment to the bracket. A safety device 30 bears against the uppermost post to prevent upward movement of the weldment during travel. Release of the safety device entails momentarily flexing same outwardly to disengage edge 30A from the post permitting the weldment to be raised and thence removed in a horizontal direction from the bracket. To provide desired rigidity of the weldment, second member 26 thereof is preferably of channel stock having flanges which overlie the vertical edges of bracket component 20.

While we have shown but one embodiment of the invention, it will be apparent to those skilled in the art that the invention may be embodied still otherwise without departing from the spirit and scope of the invention.

Having thus described the invention, what is desired to be secured in a Letters Patent is:

1. A ladder rack for temporary attachment to a pickup truck box side wall, said rack comprising, stanchions each having a horizontal support terminating in a distal end, a weldment at the lower end of each of said stanchions and having first and second members perpendicular to one another, bracket means including horizontal and vertical components for supported engagement with a side wall of the truck box, means for securing said bracket to the truck box side wall, and locking means carried by said bracket and said weldment to retain the latter in juxtaposition with the bracket in a removable manner.

2. The ladder rack claimed in claim 1 additionally including a bracket brace for abutment with the truck box side wall.

3. The ladder rack claimed in claim 1 wherein said locking means includes keyhole shaped openings formed in said weldment.

4. The ladder rack claimed in claim 1 wherein said weldment and said bracket include pin elements and pin element receiving sockets.

5. The ladder rack claimed in claim 1 wherein said weldment includes a safety device preventing relative vertical movement between the weldment and said bracket.

6. The ladder rack claimed in claim 5 wherein said bracket includes posts, said weldment defines keyhole shaped openings to receive said posts, said safety device embodied in a plate having an edge for abutment with one of said posts to confine same against movement.

7. The ladder rack claimed in claim 6 wherein said plate is of a flexible nature.

* * * * *